United States Patent
Zheng et al.

(10) Patent No.: US 9,971,660 B2
(45) Date of Patent: May 15, 2018

(54) VIRTUAL MACHINE NETWORK LOSS DETECTION AND RECOVERY FOR HIGH AVAILABILITY

(71) Applicant: VMware, Inc., Palo Alto, CA (US)

(72) Inventors: Qianyi Zheng, Beijing (CN); Pin Xie, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 246 days.

(21) Appl. No.: 14/485,198

(22) Filed: Sep. 12, 2014

(65) Prior Publication Data

US 2016/0077935 A1    Mar. 17, 2016

(51) Int. Cl.
*G06F 11/00* (2006.01)
*G06F 11/20* (2006.01)
*H04L 12/24* (2006.01)
*H04L 12/26* (2006.01)

(52) U.S. Cl.
CPC ........ *G06F 11/2028* (2013.01); *G06F 11/203* (2013.01); *H04L 41/046* (2013.01); *H04L 41/0668* (2013.01); *H04L 43/0811* (2013.01); *G06F 11/2035* (2013.01); *G06F 11/2046* (2013.01); *G06F 2201/815* (2013.01)

(58) Field of Classification Search
CPC .............. G06F 11/2033; G06F 11/203; G06F 2201/815; G06F 11/2023
See application file for complete search history.

(56) References Cited

U.S. PATENT DOCUMENTS

| | | | | |
|---|---|---|---|---|
| 2007/0180314 A1* | 8/2007 | Kawashima | ........ | G06F 11/2023 714/15 |
| 2009/0125904 A1* | 5/2009 | Nelson | ................ | G06F 9/45558 718/1 |
| 2009/0138752 A1* | 5/2009 | Graham | .............. | G06F 11/1484 714/4.1 |
| 2009/0222558 A1* | 9/2009 | Xu | .......................... | G06F 9/485 709/224 |
| 2012/0294606 A1* | 11/2012 | Miller | ................. | H04L 43/0811 398/27 |
| 2012/0311576 A1 | 12/2012 | Shu et al. | | |
| 2014/0379645 A1* | 12/2014 | Wickremesinghe | .. | G06F 11/203 707/624 |

OTHER PUBLICATIONS

VMware vSphere Distributed Switch Best Practices, Technical White Paper, Copyright 2012 VMware, Inc., 30 pages.

\* cited by examiner

*Primary Examiner* — Jason B Bryan
(74) *Attorney, Agent, or Firm* — Nicholson de vos Webster & Elliott LLP

(57) ABSTRACT

Exemplary methods, apparatuses, and systems determine that a first physical network interface controller of a first host computer has lost a client traffic network connection. At least one data compute node running on the first host computer has client traffic transmitted via the client traffic network connection. In response to the loss of the client traffic network connection, one or more host computers each having a physical network interface controller with a functioning network connection for the client traffic are identified. Further in response to the loss of the client traffic network connection, the data compute node is moved to one of the identified host computers. The first host computer utilizes a second physical network interface controller to move data compute node.

18 Claims, 4 Drawing Sheets

VIRTUAL MACHINE NETWORK LOSS DETECTION AND RECOVERY FOR HIGH AVAILABILITY

FIELD OF THE INVENTION

The various embodiments described herein relate to high availability for virtual machine networks. In particular, embodiments relate to virtual machine recovery in response to network loss.

BACKGROUND OF THE INVENTION

Virtualization is a key technology in enterprise datacenters and cloud services. It provides flexibility and allows multiple virtual machines (VMs) to run in a single physical server, which increases hardware utilization. Along with server consolidation, however, comes the risk that a hardware failure will impact more VMs, and therefore more applications/services. As a result, a primary consideration for the architecture of a virtual datacenter is how to best maximize the availability of the services provided by the virtual machines. Availability solutions are designed to improve the resiliency of local systems or entire sites and fall broadly into the categories of downtime avoidance and fault recovery.

Fault recovery solutions include high availability. High availability (HA) is an automated failover solution, typically within a single datacenter, that responds to unplanned outages and restarts or migrates virtual machines as appropriate. For example, if the host computer running a virtual machine fails, HA may respond by restarting the virtual machine on another host computer. HA has become more important than ever, as the unavailability of services can cost a business up to millions of dollars per hour.

HA solutions provide for recovery in case of server (host) failure, guest (VM) operating system failure, VM application failure, and storage failure. In a virtualization environment, however, VMs also rely on physical network interface controller (PNIC) connectivity to communicate with VMs on other hosts and the external world. Although PNIC teaming technology provides redundancy of network connectivity and eliminates a single point of failure, a VM network may still fail due to backing PNIC(s) or switch port failures, network cable disconnections, switch misconfigurations, power failures, etc. When such a failure occurs, the VM network is lost and clients cannot access the services running on the VMs despite the VMs and the corresponding applications otherwise continuing to run properly within the host computer.

A VM network may be created such that it shares the same PNICs with a management network. When network failure induces VM network loss, the management network also fails. A management network isolation response will help initiate VM restart on other healthy hosts. Configuring the VM and management networks to share the same PNICs, however, has the side effect of also restarting VMs in response to what would otherwise only be a management network isolation event. Restarting VMs in response to such an event will cause unreasonable and unnecessary service downtime for customers.

Additionally, application level HA solutions may be added to the applications running inside VMs to protect these applications from network failure. These solutions, however, are costly. In a virtualization environment, a network failure can impact a large number of VMs, and application level HA solutions would need to be applied in each of the impacted VMs to provide protection. Furthermore, an application level HA solution is application and operating system specific. Protection of multiple VMs, therefore, includes the complication of considering various application and operating system types.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein monitor a first physical network interface controller (PNIC) of a first host computer to determine if the first PNIC has lost a client traffic network connection. In response to the loss of the client traffic network connection, one or more VMs having client traffic transmitted via the client traffic network connection are moved via a second physical network interface controller to one or more host computers that each have a physical network interface controller with a functioning client traffic network connection. As a result, embodiments described herein minimize interruptions to services provided by the VMs due to lost network connectivity.

Figure 1:
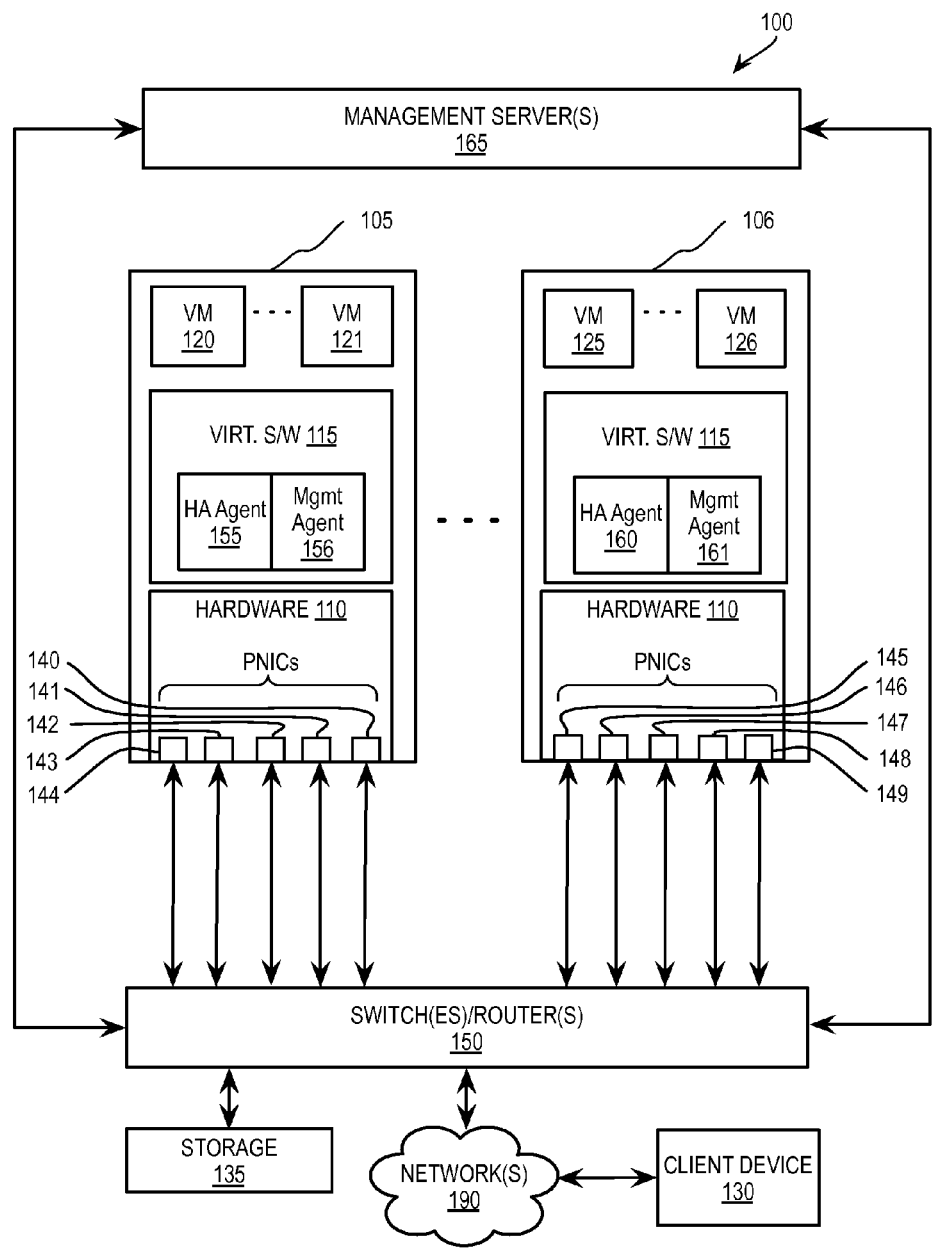
FIG. 1 illustrates, in block diagram form, an exemplary virtual datacenter environment including one or more networked processing devices implementing virtual machine recovery in response to detecting a loss of a virtual machine network connection.

FIG. 1 illustrates, in block diagram form, exemplary virtual datacenter environment 100 including one or more networked processing devices implementing virtual machine recovery in response to detecting a loss of a virtual machine network connection. Virtualized datacenter environment 100 includes multiple physical computers (host computers) 105-106. Each host computer 105/106 includes a plurality of VM's 120-126. As used herein, the term "VM" refers generally to an isolated user space instance such as a virtual machine running within a virtualization environment. As described in further detail below, other technologies aside from hardware virtualization can provide isolated user space instances, also referred to as data compute nodes (DCNs). For example, DCNs may include VMs 120-126, containers, virtual private servers, or other virtual machines. In one embodiment, VM's 120-126 are complete computation environments, containing virtual equivalents of the hardware and system software components of a physical system.

In one embodiment, two or more host computers 105-106 are configured as a cluster. A cluster of host computers is managed, e.g., by one or more management servers 165, as a single entity. For example, when a host computer 105/106 is added to a cluster, the host computer's resources become part of the cluster's resources. As a result, VMs 120-126 may be provisioned across and failed over or otherwise moved between host computers 105-106 within the cluster.

VMs 120-126 are implemented by a virtualization infrastructure, which includes virtualization software layer 115 (e.g., a hypervisor) running on hardware 110. Virtualization software layer 115 manages physical resources as well as maintains virtual-to-physical hardware mappings. For example, the server-based computing illustrated in virtualized datacenter environment 100 allows client device(s) 130 to access, via network(s) 190 (e.g., a local area network or other private or publically accessible wide area network, such as the Internet), virtual desktops and/or network services implemented by VMs 120-126.

The virtualization software layer 115 of each host computer 105, 106 includes an HA agent 155, 160, respectively. HA agents 155, 160 are responsible for monitoring the health of VMs 120-126 (e.g., within the same host computer 105, 106) and restarting any that fail (e.g., within the same or on another host computer 105, 106). As described herein with reference to FIGS. 2-3, HA agents 155, 160 monitor VM network connections to detect failures and, in response, move affected VMs 120-126 to a host computer 105, 106 with a health VM network connection.

In one embodiment, HA agents 155, 160 are designated as a master agent or a slave agent. For example, there may be a single master (or primary) HA agent and one or more slave (or secondary) HA agents within a cluster of host computers 105, 106. The master HA agent is responsible for monitoring the health of the VM network for the host computer on which the master HA agent runs. The master HA agent is also responsible for monitoring the health of the VM networks of other host computers within the cluster. For example, each slave HA agent monitors the health of the VM network for the corresponding host computer on which the slave HA agent runs and the slave HA agent reports the state of the VM network (including state changes) to the master HA agent. In one embodiment, the master HA agent in the cluster will store the overall state information about VMs 120-126, host computers 105-106, storage 135, and/or network connections of all host computers 105-106 in the cluster. As a result, the master HA agent can coordinate the movement of VMs 120-126 from a host computer with a failed VM network connection to a host computer with a healthy VM network connection. In one embodiment, the master HA agent communicates a decision to move one or more VMs 120-126 to the corresponding slave HA agent(s) to execute the move operation(s). One of HA agents 155, 160 may take on the role of master or slave according to known methodologies. For example, roles may be assigned based upon a comparison of media access control (MAC) addresses, random or another peer-to-peer election, administrator designation, etc.

The virtualization software layer 115 of each host computer 105, 106 also includes management agent 156, 161. Management agent 156, 161 manages operations performed on the respective host computer 105, 106. For example, management agent 156 executes one or more operations to power on VMs 120-121, move VMs 120-121 to another host computer 106, map VMs 120-121 to port groups/network connections, configure backing PNICs/NIC teaming for port groups, etc. In one embodiment, management agents 156, 160 execute one or more of these operations in response to commands from one or more management servers 165. Additionally, each management agent 156, 160 may track each of the VMs 120-126 registered with the respective host computer 105, 106, what logical partitions of storage 135 are available to the host computer 105/106, etc.

In one embodiment, HA agent 155, 160 communicates with management agent 156, 161. For example, management agent 156, 161 may communicate the state of the VMs 120-126, the mapping of VMs 120-126 to network connections, the state of the VM network connection(s), and/or the state of host and storage resources to HA agent 155, 160. Additionally, HA agent 155, 160 may utilize management agent 156, 161 to move or otherwise manage VMs 120-126, e.g., via an application programming interface (API).

In one embodiment, management server 165 is responsible for configuring HA settings, communicating cluster configuration changes to the master HA agent, etc. Additionally, management server 165 may transmit commands to host computers 105-106 to manage VMs 120-126, e.g., in coordination with HA agents 155-160.

Hardware 110 includes PNICs 140-149. PNICs 140-149 connect host devices 105-106 to one or more networks, e.g., via switches and/or routers 150 or directly to other devices (not shown). In one embodiment, virtualization software 115 configures PNICs 140-149 for particular purposes. For example, one or more PNICs 140 of host computer 105 may be configured as a part of a port group utilized to connect with storage 135 via a switch 150. Similarly, one or more PNICs 141 may be mapped (e.g., via one or more port groups) to one or more VMs 120-121 and utilized for client network traffic. As used herein "client network traffic" and "client traffic" refer to communication between VMs and external client devices (e.g., input/output traffic exchanged with client(s) 130) and are used interchangeably with "VM network traffic." Additionally, one or more PNICs 142 may be utilized for live-migration of VMs between host computers 105-106, one or more PNICs 143 may be utilized for management server traffic, and one or more PNICs 144 may be utilized for fault tolerance or other synchronization traffic between host computers 105-106. In one embodiment, virtualization software 115 isolates these different types of traffic from one another by restricting particular traffic types to respective PNICs 140-149. For example, virtualization software 115 may isolate the management traffic from the virtual machine client traffic by restricting the two types of traffic from using the same port groups and/or PNICs. A user/administrator may configure all client network traffic to be assigned to a single port group backed by a team of one or more PNICs coupled to one switch 150 and management traffic to another port group backed by another team of one or PNICs coupled to a different switch 150. As a result, when network failure occurs on PNICs that are teamed for VM network traffic, it is less likely that the same failure will occur on other PNICs, e.g., unless all connected switches 150 experience power failure.

In one embodiment, the user/administrator configures VM network HA protection at the cluster level. For example, the user may elect which port group(s) are to be given HA network protection via a user interface to management server 165. Management server 165 will communicate the cluster settings to the master HA agent and the master HA agent will forward the settings to each slave HA agent within the cluster.

Figure 2:
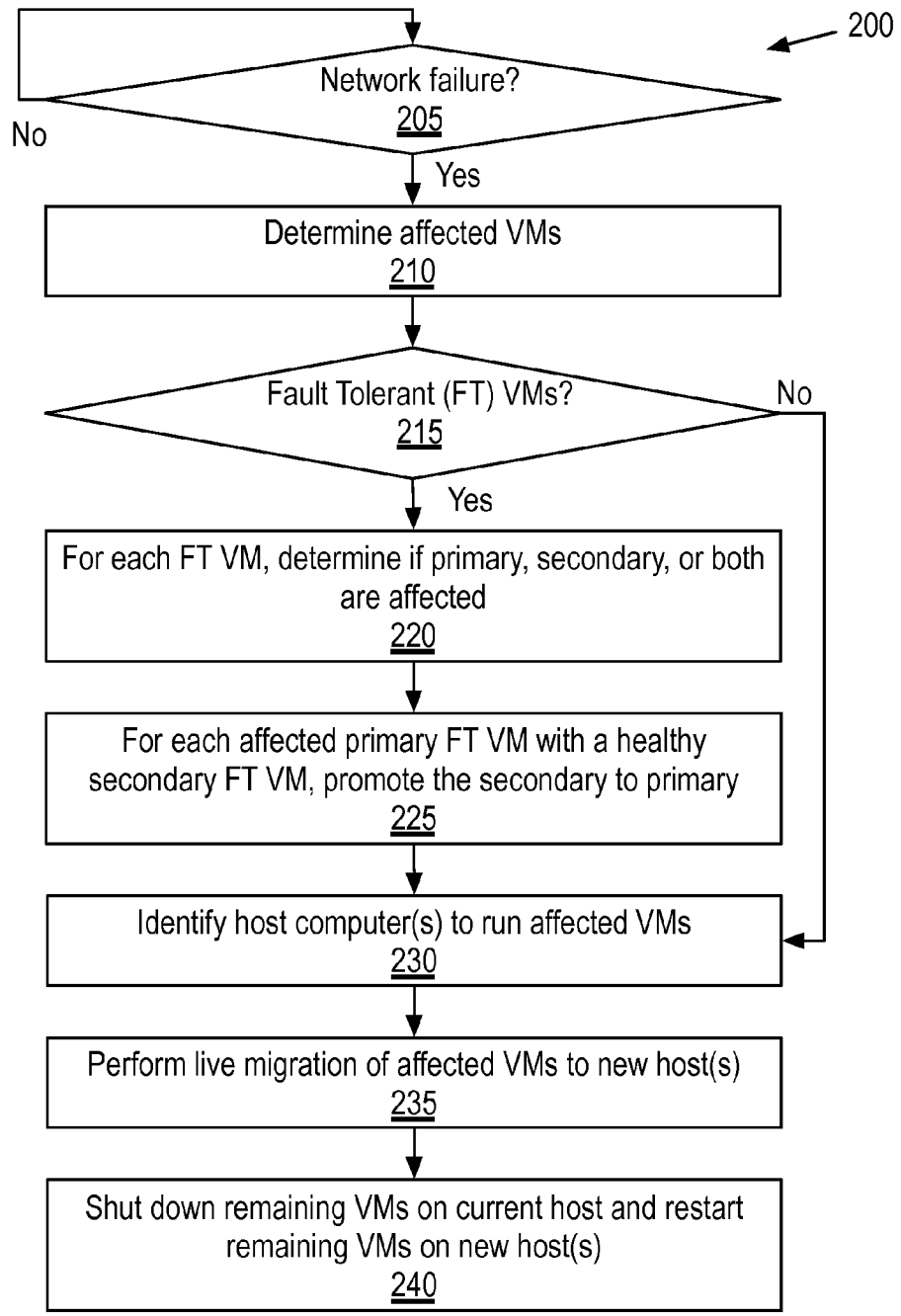
FIG. 2 is a flow chart illustrating an exemplary method of implementing virtual machine recovery in response to a loss of a virtual machine network connection.
Figure 3:
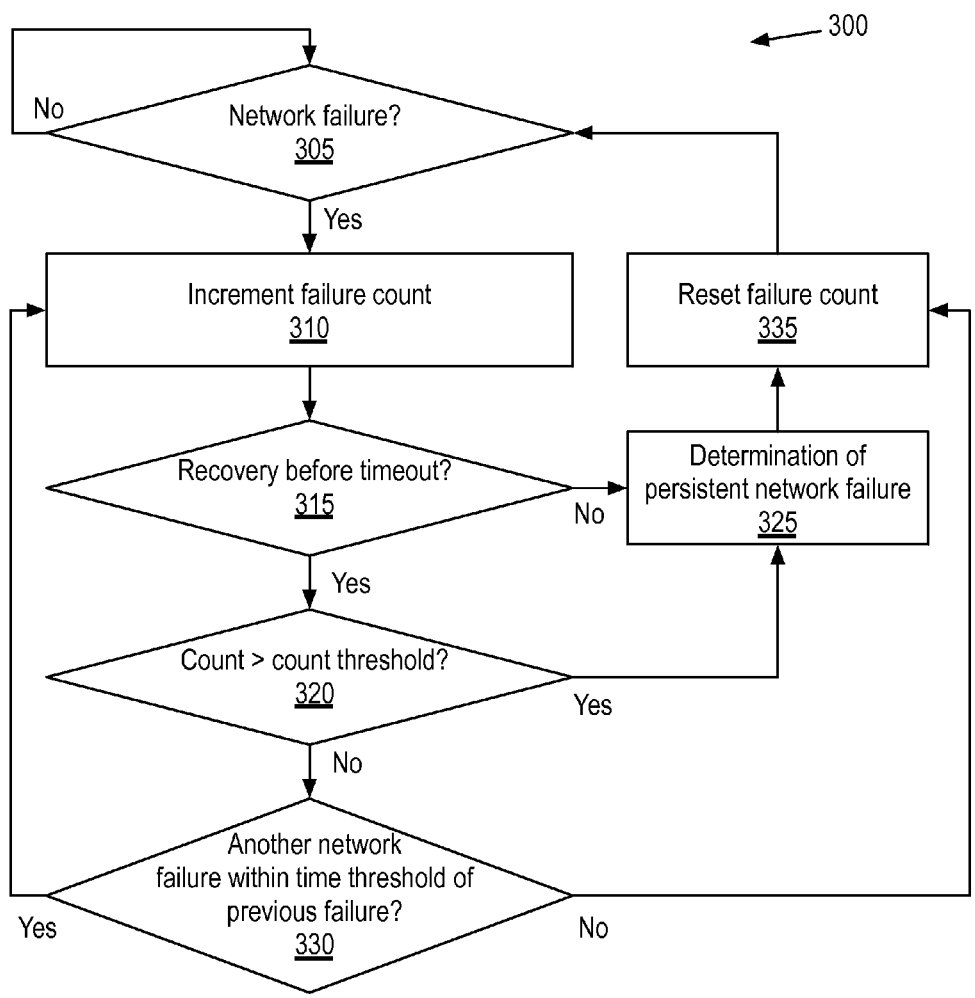
FIG. 3 is a flow chart illustrating an exemplary method of detecting a persistent loss of a virtual machine network connection.

As described further herein, e.g., with reference to FIGS. 2-3, virtualization software 115 monitors the state of one or more of PNICs 140-149 to move one or more VMs 120-126 in response to a loss of a virtual machine network connection.

FIG. 2 is a flow chart illustrating exemplary method 200 of VM recovery in response to a loss of a client network connection. At block 205, the host computer determines if the client traffic network connection (i.e., the virtual machine network connection) has failed. For example, HA agent 155 may receive the state of the one or more PNICs 141 mapped to the client network traffic port group from management agent 156. HA agent 155 may receive the network state periodically, in response to a request sent to management agent 156, and/or in response to a change in the network state. Additionally, as described above, HA agents 155-160 may be configured in a master-slave relationship. In such an embodiment, the master HA agent may receive a network state from a slave HA agent running on another host computer in a cluster. For example, if HA agent 155 was configured as a slave, it may transmit the state of the one or more PNICs 141 physically connected to the client network to master HA Agent 160.

In one embodiment, determining the state of the client network includes monitoring the state of the PNIC(s) mapped to a port group associated with client network traffic. For example, the host computer may determine network status based upon the link status provided by the PNIC driver and/or beacon probing. The link status provided by the PNIC driver can detect immediate PNIC failures, network cable disconnections, and immediate physical switch port or power failures. For example, the link status may detect a failure of PNIC 141, switch 150 coupled to PNIC 141, or a disconnection of the cable between PNIC 141 and switch 150. The link status, however, may not detect switch misconfiguration and indirect switch port failures, cable failures, and power failures.

Beacon probing is a known technique for detecting link failures; it relies on multiple PNICs within a cluster periodically (e.g., every ten seconds) broadcasting beacon packets. The host computer(s) determine if any PNICs do not receive the beacon packets as an indication that the corresponding network connection has failed. In one embodiment, at least some of the PNICs 140-149 broadcasting beacon packets are coupled to different switches 150. As a result, the beacon probing can test downstream switches (i.e., switches beyond the switches to which the PNICs are directly attached) and, therefore, detect network failures that may be missed by the link status provided by the PNIC driver.

In one embodiment, determining if the client traffic network connection has failed includes determining if a threshold number of teamed PNICs have failed or are connected to failed client network connections. In another embodiment, determining if the client traffic network connection has failed includes determining if less than a threshold number of teamed PNICs are operating normally and connected to healthy client network connections. As a result, the VM recovery may be triggered by the failure of a subset of client network connections (e.g., to guarantee a minimum bandwidth).

In one embodiment, determining if the client traffic network connection has failed includes determining if the network connection failure is persistent. For example, if the failure has not recovered before the expiration of a threshold timeout period or if another network failure occurs within a threshold period of time between failures and the cumulative number of such failures is greater than a threshold value, the HA agent determines that the network connection failure is persistent. The determination of a persistent network connection failure is described further with reference to ref FIG. 3.

If a network failure is not detected, method 200 continues monitoring the network state at block 205. If a network failure is detected, at block 210, the host computer determines which VMs are affected by the network failure. As described above, one or more PNICs may be mapped to a client network port group. In one embodiment, the management agent or the HA agent on each host computer stores this mapping for the VMs running on the host computer in a table or other data structure. For example, the HA agent may determine/update this mapping in response to a request to monitor the state of the client network connection, in response to a request for VMs affected by a failed client network connection, and/or in response to a notification of a change to VMs connected to the port group. As a result, the HA agent can reference or request the VMs mapped to the PNIC(s) with a failed network connection in response to the network failure.

At block 215, the host computer optionally determines if any of the affected VMs are configured for fault tolerance. Fault tolerant (FT) VMs are configured in primary and secondary VM pairs for redundancy. Fault tolerance is a known technology for maintaining two virtual machines, a primary and secondary, in lock step with one another. In one implementation, all non-deterministic events occurring at the primary are sent, along with insertion point information, to the secondary VM, which injects the non-deterministic events at the appropriate point in the instruction sequence so that the execution states of the primary and secondary VMs do not diverge. As a result, the secondary VM is maintained in lockstep with the primary VM and is ready to take over at any time without data loss or interruption of service should the primary fail.

If none of the affected VMs are configured for fault tolerance or if the host computer does not determine if any of the affected VMs are configured for fault tolerance, method 200 proceeds to block 230 (described below). If any of the affected VMs are configured for fault tolerance, at block 220, the host computer determines if the affected VMs include only the primary FT VM of the FT pair, only the secondary of the FT pair, or both the primary and secondary FT VMs of the FT pair. In one embodiment, the management agent or the HA agent on each host computer stores a mapping of primary and secondary FT VMs and the determination if any of the affected VMs are configured for fault tolerance includes determining if the VMs are primary or secondary FT VMs.

At block 225, for each primary FT VM with a healthy secondary FT VM (e.g., the secondary FT VM was not determined to be affected by the network connection failure), the host computer sends an instruction to promote the secondary FT VM to become the primary FT VM. For example, if VM 120 was the affected primary FT VM and VM 125 was the healthy secondary FT VM, HA agent 155 transmits a message to HA agent 160 to promote VM 125 to become the primary FT VM.

At block 230, the host computer identifies one or more other healthy host computer(s) to run the affected VMs. For example, the HA agent determines or requests (from one or more other HA agents or from management server 165) one or more host computers with healthy client traffic network connection(s) to which to move (e.g., migrate or restart) the affected VMs. In an embodiment in which the HA agents are configured in a master-slave relationship, the master HA agent maintains a list or other data structure of host computers based upon the state messages from slave HA agents as described above. For example, if the network connection failure affected the VMs running on the same host computer as the master HA agent, the master HA agent determines which host computers within the cluster have healthy network connections (and are otherwise functioning properly). If the network connection failure affected the VMs running on the same host computer as a slave HA agent, the slave HA agent sends a state message indicative of the network connection failure to the master HA agent, the master HA agent determines which host computers within the cluster have healthy network connections, and the master HA agent transmits an instruction back to the slave HA agent including which host computer(s) to which the slave HA agent should move the affected VMs.

At block 235, the host computer optionally attempts live migration of one or more of the affected VMs to the healthy host computer(s). Live migration of a VM includes moving the VM from one host computer to another host computer without first shutting down or suspending the VM. Live migration may include copying state information from the source host to the target host while the VM continues to execute on the source host. Live migration is then completed by suspending execution on the source host, copying remaining state information to the target host, and then resuming the VM on the target host without noticeable downtime of the VM. In some embodiments, live migration may result in less service downtime (caused by the network failure) for the VMs than restarting the VMs on other host computers. In one embodiment, the host computer performs the live migration utilizing a different PNIC network connection than the PNIC(s) mapped to the failed VM network. As described above, teams of one or more PNICs may be mapped to different port groups for different network traffic purposes. As a result, while the client traffic network connection may have failed (e.g., due to the corresponding PNICs network connection failure), a live migration network connection (using different PNICs) may still be healthy.

At block 240, the host computer shuts down the remaining affected VMs on the current host computer and restarts the affected VMs (that have not been migrated) on the healthy host computer(s) (e.g., each with a healthy VM network connection). For example, the HA agent shuts down and unmounts the affected VMs on the host computer with the failed client traffic network connection. The HA agent sends a message to the HA agent on the new host computer(s) to mount and start the affected VMs (directly or indirectly via the management server). In one embodiment, the remaining affected VMs (if there are any) include those VMs that were not moved via live migration.

If an affected VM was determined to be a primary FT VM with a healthy secondary FT VM and the secondary FT VM was promoted to primary, the old primary FT VM is shut down and restarted as a secondary FT VM on a new host computer or a new secondary FT VM is started on a new host computer. If an affected VM was determined to be a secondary FT VM with a healthy primary FT, the secondary FT VM is shut down and restarted as a secondary FT VM on a new host computer or a new secondary FT VM is started on a new host computer. If both the primary FT VM and secondary FT VM are affected, both FT VMs are shut down and restarted on new host computers or new primary and secondary FT VMs are started on new host computers. In one embodiment, starting/restarting the FT VMs is performed prior to attempting live migration of VMs.

In one embodiment, the host computer moves the remaining VMs utilizing a different PNIC than the PNIC mapped to the failed VM network connection. As described above, teams of one or more PNICs may be connected to different switches/networks. As a result, while the client traffic network connection may have failed, a management network connection used to communicate or otherwise initiate the starting of the VM(s) on another host computer may still be healthy.

FIG. 3 is a flow chart illustrating exemplary method 300 of detecting a persistent loss of a virtual machine network connection. At block 305, the HA agent determines if client traffic network connection has failed. If the network connection has not failed, method 300 continues monitoring the network connection at block 305. If the network connection has failed, at block 310, the HA agent increments a network connection failure counter.

At block 315, the HA agent determines if the network connection has recovered within a timeout period. For example, a brief loss of the network connection may not warrant moving VMs to another host computer. In one embodiment, the timeout period is set by an administrator/user. Alternatively, the timeout period is set to default period of time, e.g., thirty seconds.

If the network connection recovers within the timeout period, at block 320, the HA agent determines if the network connection counter has reached/exceeded a counter threshold. For example, even if network connection recovers within the timeout period, multiple subsequent network connection failures may be determined to be a persistent network connection failure. In one embodiment, the threshold counter value is set by an administrator/user. Alternatively, the threshold counter value is set to default value, e.g., five subsequent failures.

At block 325, if the network connection has not recovered within the timeout period or if the counter has reached/exceeded the threshold counter value, the HA agent determines that the network connection failure is persistent. For example, a determination of persistent network connection failure may be used at block 205 of method 200.

If the network connection has recovered within the timeout period and if the counter has not reached/exceed the threshold counter value, at block 330, the HA agent monitors the network connection for another failure within a threshold period of time. For example, the HA agent may find the network connection failure to be persistent if the subsequent failures each occur within a threshold time between failures. In one embodiment, the time between failures threshold is set by an administrator/user. Alternatively, the time between failures threshold is set to default period of time, e.g., sixty seconds.

If another failure occurs within the threshold period of time, method 300 returns to block 310 to increment the counter. If another failure does not occur within the threshold period of time or following a determination of persistent failure, at block 335, the HA agent resets the counter and method 300 resumes monitoring the network connection at block 305.

Figure 4:
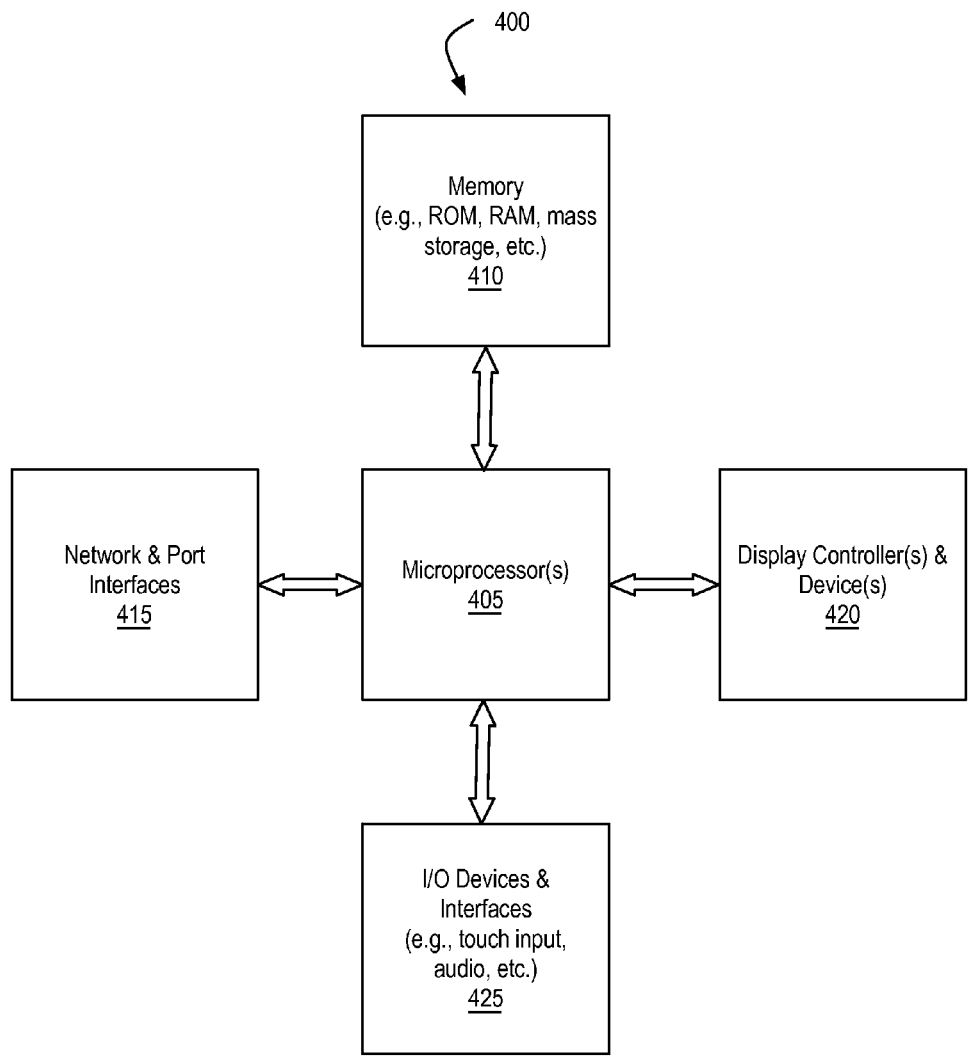
FIG. 4 illustrates, in block diagram form, an exemplary processing system to implement virtual machine recovery in response to detecting a loss of a virtual machine network connection.

FIG. 4 illustrates, in block diagram form, exemplary processing system 400 to implement virtual machine recovery in response to detecting a loss of a virtual machine network connection. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of host device(s) 105-106, management server(s) 165, client device(s) 130, and storage device(s) 135 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
    determining that a first physical network interface controller of a first host computer has lost a client traffic network connection, wherein at least one data compute node running on the first host computer has client traffic transmitted via the client traffic network connection;
    determining, in response to the loss of the client traffic network connection, the loss of the client traffic network connection is a persistent network failure;
    determining that the data compute node is configured as a primary data compute node of a pair of primary and secondary data compute nodes configured for fault tolerance;
    determining that the secondary data compute node is operating normally;
    replacing the primary data compute node by promoting the secondary data compute node to be configured as a new primary data compute node in response to determining that the loss of the client traffic network connection is the persistent network failure and in response to determining that the secondary data compute node is operating normally;
    identifying, in response to determining the loss of the client traffic network connection is the persistent network failure, one or more host computers from a data structure storing a health status of network connections for each of a plurality of host computers, each having a physical network interface controller with a functioning network connection for the client traffic; and
    moving, further in response to determining the loss of the client traffic network connection is the persistent network failure, the data compute node that was formerly configured as the primary data compute node to one of the identified host computers as a new secondary data compute node, wherein the new secondary data compute node is configured for fault tolerance with the new primary data compute node, and wherein the first host computer utilizes a second physical network interface controller to move the new secondary data compute node.

2. The computer-implemented method of claim 1, wherein the determining that the first physical network interface controller has lost the client traffic network connection is based upon a link status provided by a device driver for the first physical network interface controller and/or the first network interface controller not receiving a periodically broadcasted beacon packet from one or more other physical network interface controllers.

3. The computer-implemented method of claim 1, wherein network traffic used to move the data compute node is isolated from one or more physical network interface controllers, including the first physical network interface controller, that are utilized for the client traffic.

4. The computer-implemented method of claim 1, wherein determining the loss of the client traffic network connection is the persistent network failure comprises:
    detecting the client traffic network connection failing to recover from a network connection failure within a threshold period of time.

5. The computer-implemented method of claim 1, wherein determining the loss of the client traffic network connection is the persistent network failure comprises:
    determining an occurrence of a threshold number of failures of the client traffic network connection, each of the threshold number of failures occurring within a threshold period of time.

6. The computer-implemented method of claim 1, wherein moving the data compute node that was formerly configured as the primary data compute node to the one of the identified host computers includes shutting down the data compute node running on the first host computer and powering the data compute node up on a second host computer within the identified one or more host computers.

7. The computer-implemented method of claim 1, wherein the data compute node is a virtual machine.

8. The computer-implemented method of claim 7, wherein moving the virtual machine to the one of the identified host computer includes a live migration of the virtual machine from the first host computer to a second host computer within the one or more identified host computers, wherein the live migration is performed without interrupting one or more services running on the virtual machine.

9. A non-transitory computer-readable medium storing instructions, which when executed by a processing device, cause the processing device to perform a method comprising:
    determining that a first physical network interface controller of a first host computer has lost a client traffic network connection, wherein at least one data compute node running on the first host computer has client traffic transmitted via the client traffic network connection;
    determining, in response to the loss of the client traffic network connection, the loss of the client traffic network connection is a persistent network failure;
    determining that the data compute node is configured as a primary data compute node of a pair of primary and secondary data compute nodes configured for fault tolerance;
    determining that the secondary data compute node is operating normally;
    replacing the primary data compute node by promoting the secondary data compute node to be configured as a new primary data compute node in response to determining that the loss of the client traffic network connection is the persistent network failure and in response to determining that the secondary data compute node is operating normally;

identifying, in response to determining the loss of the client traffic network connection is the persistent network failure, one or more host computers from a data structure storing a health status of network connections for each of a plurality of host computers, each having a physical network interface controller with a functioning network connection for the client traffic; and moving, further in response to determining the loss of the client traffic network connection is the persistent network failure, the data compute node that was formerly configured as the primary data compute node to one of the identified host computers as a new secondary data compute node, wherein the new secondary data compute node is configured for fault tolerance with the new primary data compute node, and wherein the first host computer utilizes a second physical network interface controller to move the new secondary data compute node.

10. The non-transitory computer-readable medium of claim 9, wherein the determining that the first physical network interface controller has lost the client traffic network connection is based upon a link status provided by a device driver for the first physical network interface controller and/or the first network interface controller not receiving a periodically broadcasted beacon packet from one or more other physical network interface controllers.

11. The non-transitory computer-readable medium of claim 9, wherein network traffic used to move the data compute node is isolated from one or more physical network interface controllers, including the first physical network interface controller, that are utilized for the client traffic.

12. The non-transitory computer-readable medium of claim 9, wherein determining the loss of the client traffic network connection is the persistent network failure comprises:
detecting the client traffic network connection failing to recover from a network connection failure within a threshold period of time.

13. The non-transitory computer-readable medium of claim 9, wherein determining the loss of the client traffic network connection is the persistent network failure comprises:
determining an occurrence of a threshold number of failures of the client traffic network connection, each of the threshold number of failures occurring within a threshold period of time.

14. The non-transitory computer-readable medium of claim 9, wherein moving the data compute node that was formerly configured as the primary data compute node to the one of the identified host computers includes shutting down the data compute node running on the first host computer and powering the data compute node up on a second host computer within the identified one or more host computers.

15. The non-transitory computer-readable medium of claim 9, wherein the data compute node is a virtual machine.

16. The non-transitory computer-readable medium of claim 15, wherein moving the virtual machine to the one of the identified host computer includes a live migration of the virtual machine from the first host computer to a second host computer within the one or more identified host computers, wherein the live migration is performed without interrupting one or more services running on the virtual machine.

17. An apparatus comprising:
a processing device; and
a memory coupled to the processing device, the memory storing instructions which, when executed by the processing device, cause the apparatus to:
determine that a first physical network interface controller of a first host computer has lost a client traffic network connection, wherein at least one data compute node running on the first host computer has client traffic transmitted via the client traffic network connection;
determine, in response to the loss of the client traffic network connection, the loss of the client traffic network connection is a persistent network failure;
determine that the data compute node is configured as a primary data compute node of a pair of primary and secondary data compute nodes configured for fault tolerance;
determine that the secondary data compute node is operating normally;
replace the primary data compute node by promoting the secondary data compute node to be configured as a new primary data compute node in response to determining that the loss of the client traffic network connection is the persistent network failure and in response to determining that the secondary data compute node is operating normally;
identify, in response to determining the loss of the client traffic network connection is the persistent network failure, one or more host computers from a data structure storing a health status of network connections for each of a plurality of host computers, each having a physical network interface controller with a functioning network connection for the client traffic; and
move, further in response to determining the loss of the client traffic network connection is the persistent network failure, the data compute node that was formerly configured as the primary data compute node to one of the identified host computers as a new secondary data compute node, wherein the new secondary data compute node is configured for fault tolerance with the new primary data compute node, and wherein the first host computer utilizes a second physical network interface controller to move the new secondary data compute node.

18. The apparatus of claim 17, wherein network traffic used to move the data compute node is isolated from one or more physical network interface controllers, including the first physical network interface controller, that are utilized for the client traffic.

* * * * *